United States Patent
Yoshii

(10) Patent No.: US 12,440,220 B2
(45) Date of Patent: Oct. 14, 2025

(54) APPLICATOR AND LIGATION DEVICE

(71) Applicant: OLYMPUS CORPORATION, Hachioji (JP)

(72) Inventor: Toshihiro Yoshii, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 706 days.

(21) Appl. No.: 17/879,448

(22) Filed: Aug. 2, 2022

(65) Prior Publication Data

US 2022/0370076 A1 Nov. 24, 2022

Related U.S. Application Data

(63) Continuation of application No. PCT/JP2020/004050, filed on Feb. 4, 2020.

(51) Int. Cl.
*A61B 17/128* (2006.01)
*A61B 17/122* (2006.01)
*A61B 17/00* (2006.01)

(52) U.S. Cl.
CPC ........ *A61B 17/1285* (2013.01); *A61B 17/122* (2013.01); *A61B 2017/00336* (2013.01); *A61B 2017/00367* (2013.01); *A61B 2017/00477* (2013.01); *A61B 2017/00862* (2013.01)

(58) Field of Classification Search
CPC .............. A61B 17/1285; A61B 17/122; A61B 2017/00336; A61B 2017/00367; A61B 2017/00477; A61B 2017/00865
See application file for complete search history.

(56) References Cited

U.S. PATENT DOCUMENTS

2019/0150929 A1 5/2019 Gregan et al.
2019/0231353 A1 8/2019 Saenz Villalobos et al.

FOREIGN PATENT DOCUMENTS

| CN | 102727276 A | 10/2012 |
| CN | 202699218 U | 1/2013 |
| JP | 2002-191609 A | 7/2002 |
| JP | 2009-072611 A | 4/2009 |
| JP | 5750620 B2 | 7/2015 |
| JP | 2019-520902 A | 7/2019 |
| WO | 2018/063984 A1 | 4/2018 |

OTHER PUBLICATIONS

Jun. 27, 2023 Office Action issued in Japanese Application No. 2021-575122.
May 19, 2020 International Search Report issued in International Patent Application No. PCT/JP2020/004050.

*Primary Examiner* — Ryan J. Severson
(74) *Attorney, Agent, or Firm* — Oliff PLC

(57) ABSTRACT

A ligation device that includes a clip device including an openable arm, a connector connected to the clip device and is able to be released from the connector, a wire connected to the connector and configured to operate the clip device, and a pipe including an opening into which the wire is inserted. An inner diameter of the opening is smaller than a dimension in a diameter direction of the connector in a first state in which the connector and the clip device are connected with each other, and the inner diameter of the opening decreases towards a proximal end side of the pipe and is larger than the dimension of the connector in a second state in which the connector and the clip device are unconnected with each other.

20 Claims, 9 Drawing Sheets

APPLICATOR AND LIGATION DEVICE

This application is a continuation application of PCT International Application No. PCT/JP2020/004050, filed Feb. 4, 2020. The content of the PCT International Application is incorporated herein by reference.

TECHNICAL FIELD

The present disclosure relates to an applicator, and more specifically, relates to an applicator to which an indwelling device configured to ligate tissues is attached and a ligation device including the applicator.

BACKGROUND

A ligation using an indwelling device such as a clip unit or the like is known as a procedure performed using an endoscope. The clip unit has a pair of arms. When the pair of arms is pulled by a predetermined amount in a state in which the pair of arms sandwich the tissues, the pair of arms are locked with the tissue strongly tightened.

The clip unit is introduced into the body while being attached to an applicator. Since the clip unit is indwelled in the body in the state of ligating the tissues, it is necessary to separate the pair of arms from the applicator after the pair of arms are locked.

There are several known aspects for releasing the connection between the applicator and the clip unit. For example, an aspect in which a member connecting the applicator and the clip unit is broken, an aspect in which a member is deformed without being broken to release the connection, and an aspect in which a member is rotated to release the connection.

The release of the connection by the deformation is more preferable than the release of the connection by breaking the member in that small pieces are not generated. The release of the connection by the deformation is more preferable than the disconnection by the rotation in that the connection can be released only by the traction operation of the operation transmission member connected to the member.

An operator closes the pair of arms to clamp the target tissues, and confirms whether the ligation is sufficient while confirming the grasping position. In a case in which the ligation is determined to be insufficient, the pair of arms are opened to release the clamping with respect to the target tissues, and the ligation operation is performed again. Then, in a case in which the ligation is determined to be sufficient, the arms are locked. At this time, the operator can recognize a gap of the force since the operating force (locking force) requited to lock the arms of the clip unit is significantly larger than the force required to ligate the target tissues such that it is possible to operate without accidentally locking the arm.

The amount of the operating force (locking force) required to lock the arms of the clip unit changes depending on the reaction force received from the target tissues sandwiched by the arms. Once the target tissues are harder, it is necessary for the locking force to become larger.

In the case in which the release of the connection is performed by the deformation is applied to the clip unit, it is impossible to ligate the tissues it the connection is released before completing the locking operation. Accordingly, the operating force (releasing force) required for releasing the connection is usually set to be larger than the locking force. Furthermore, from a viewpoint of securing the above-mentioned force gap, there is a case in which the locking force may be set even larger. Here, the releasing force is set based on the locking force in the case of sandwiching the tissues with an average hardness by the arms, it is possible that the connection is released even though the locking is not completed in the case of sandwiching the rigid tissues. It is possible to avoid such possibility by setting the releasing force based on the locking force when the arms sandwich the rigid tissue; however, the releasing force becomes significantly large such that the operation may become difficult.

Furthermore, there is another problem with the operation feeling. When the operating force does not change or increases after the connection is released due to the deformation, the operator cannot recognize that the connection has been released. As a result, the unnecessary operations are continued and the operation itself becomes complicated.

SUMMARY

According to an aspect of the present disclosure, a ligation device includes a clip device including an openable arm; a connector connected to the clip device, the connector being configured to be released from the clip device; a wire connected to the connector and configured to operate the clip device; and a pipe including an opening into which the wire is inserted, an inner diameter of the opening being smaller than a dimension in a diameter direction of the connector in a first state in which the connector and the clip device are connected with each other, and the inner diameter of the opening decreases towards a proximal end side of the pipe and is larger than the dimension of the connector in a second state in which the connector and the clip device are unconnected with each other.

According to another aspect of the present disclosure, a ligation device includes a clip arm configured to be openable; an assistance member into which at least part of the clip arm is inserted; and an opening provided in the assistance member, the opening including a first diameter when the clip arm is arranged at a first position, and the opening is configured to be enlarged to a second diameter, which is larger than the first diameter, when the clip arm is arranged at a second position closer to the opening than the first position.

According to a further aspect of the present disclosure, a connection release method of an indwelling device in a ligation device, the ligation device including a connector releasably connected so the indwelling device that is configured to be disposed in a specimen, a force transmission member connected to the connector, and an assistance member including an opening into which the force transmission member is inserted, the connection release method comprising: making the connector to come into contact with the assistance member by pulling the force transmission member; separating the connector from the indwelling device by making the connector contact the assistance member to deform the connector; and enlarging an inner diameter of the opening from a first diameter, which is smaller than an outer diameter of the connector, to a second diameter, which is larger than the outer diameter of the connector, by pulling the force transmission member.

DESCRIPTION OF EMBODIMENTS

A first embodiment of the present disclosure will be described with reference to FIG. 1 to FIG. 9.

Figure 1:
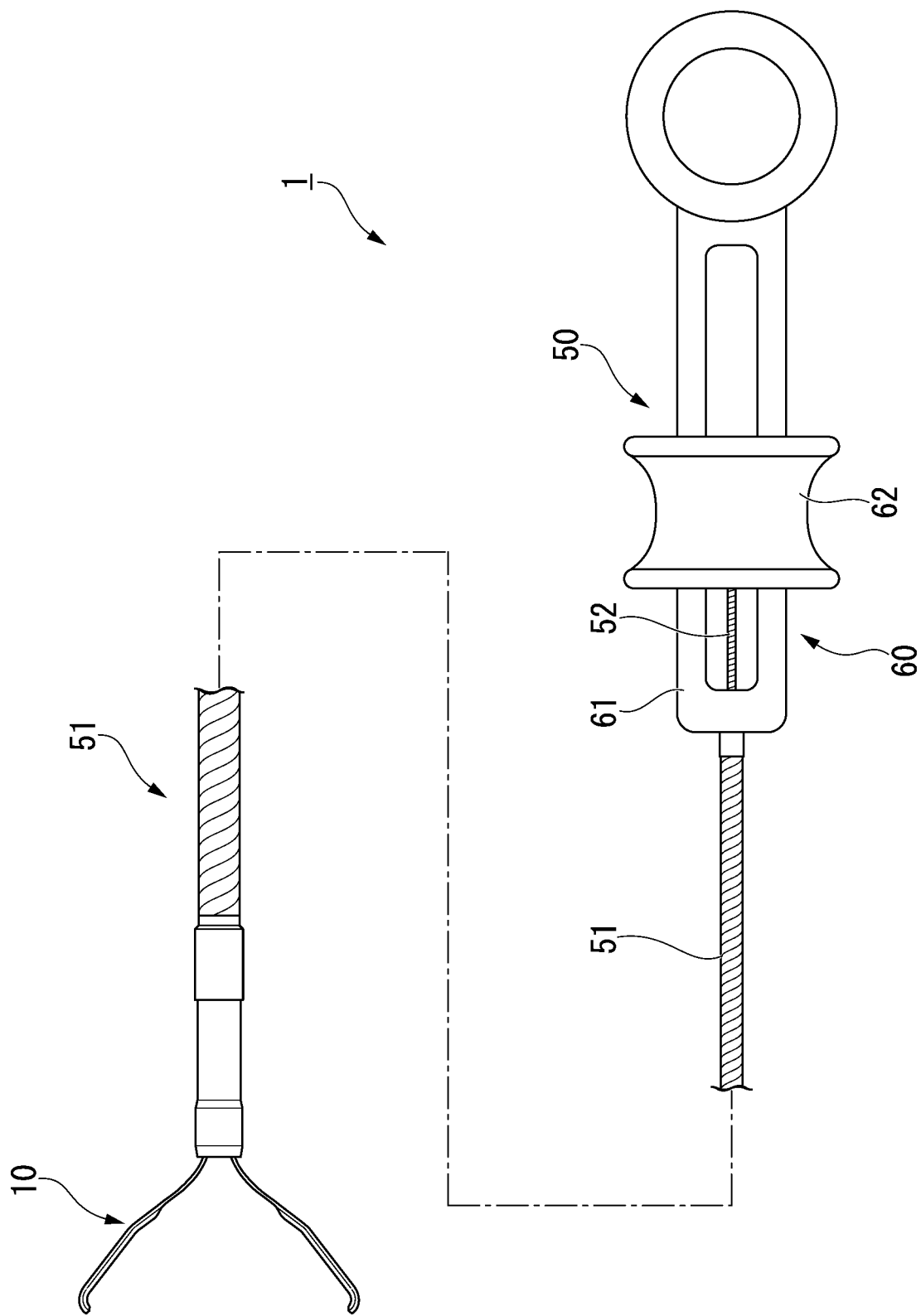
FIG. 1 is an overall view showing a configuration of a ligation device according td a first embodiment of the present disclosure.

FIG. 1 is a view showing an appearance of a ligation device 1 as a medical device according to the present embodiment. The ligation device 1 includes a clip unit (indwelling device) 10 to be indwelled in the body and an applicator 50 for operating the clip unit 10. The clip unit 10 is attached to a front end (distal end) of the applicator 50.

Figure 2:
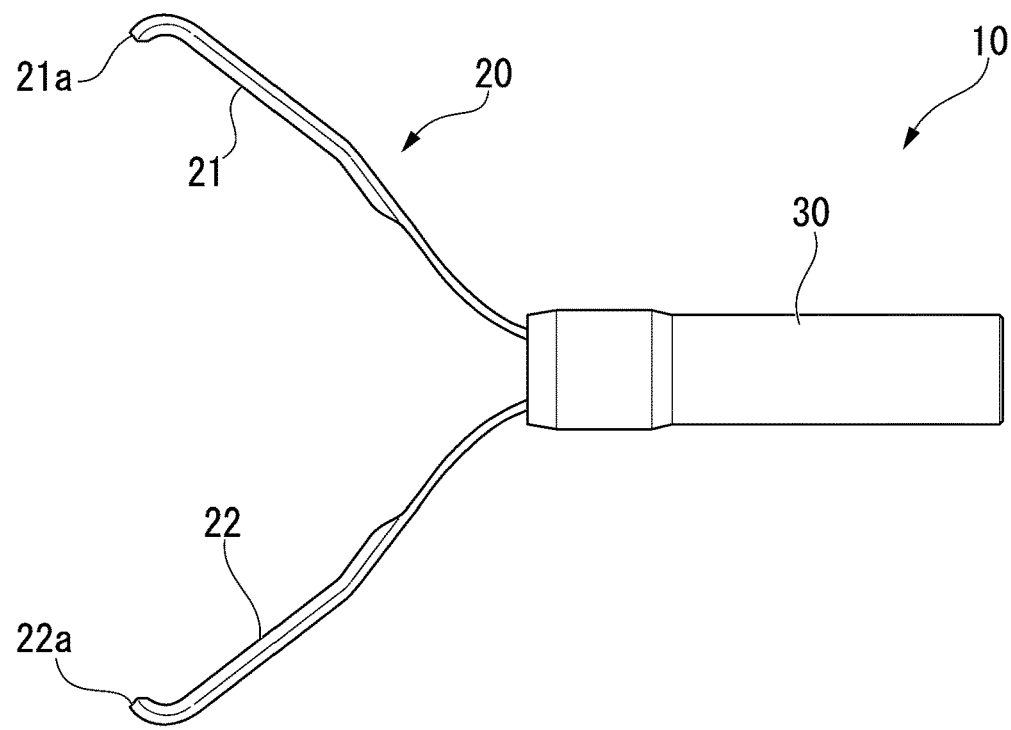
FIG. 2 is a view showing a clip unit of the ligation device.
Figure 3:
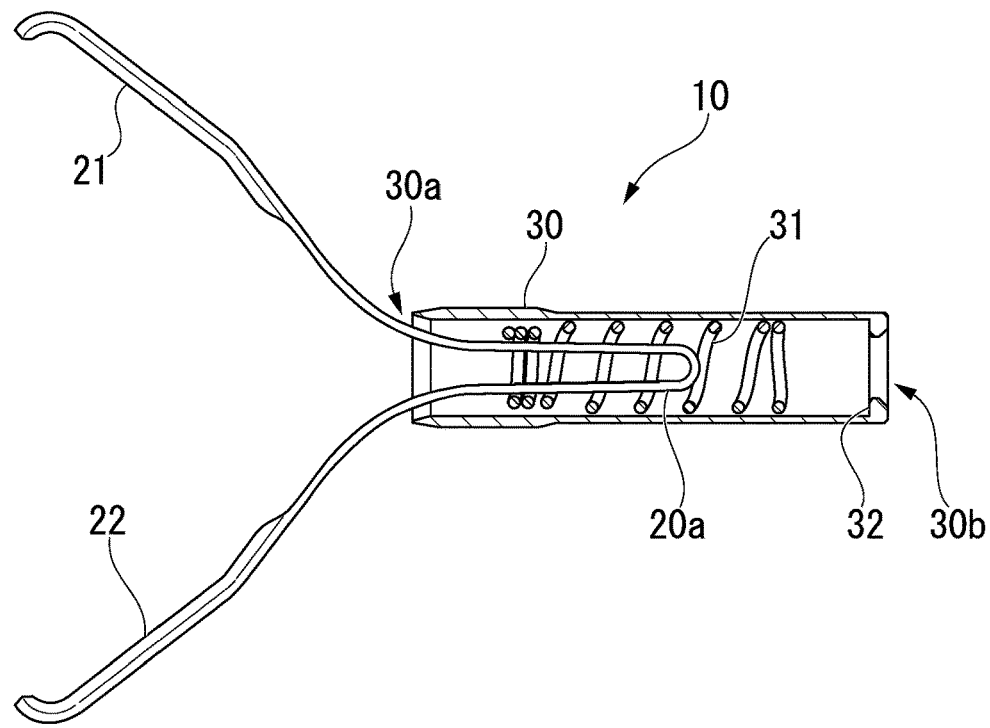
FIG. 3 is a cross-sectional view showing the clip unit.

FIG. 2 is a view showing an appearance of the clip unit 10. FIG. 3 is a cross-sectional view showing the clip unit 10. As shown in FIG. 2, the clip unit 10 includes an arm portion 20 and a pressing tube 30 in which a part of the arm portion 20 is accommodated.

The arm portion 20 has a pair of arms as a first arm 21 and a second arm 22. The first arm 21 and the second arm 22 have a claw 21a and a claw 22a at distal ends thereof, respectively. As shown in FIG. 3, the first arm 21 and the second arm 22 are connected as the proximal-end portion 20a of the arm portion 20. The proximal-end portion 20a is formed in a U shape.

The arm portion 20 is made of an alloy or metal. The examples of the material of the arm portion 20 include the stainless steel, the cobalt-chromium alloy, the nickel-titanium alloy and the like.

The first arm 21 and the second arm 22 are expanded in an initial state as shown in FIG. 2. When the first arm 21 and the second arm 22 approach each other from the initial state, a biasing force to return to the initial state is generated due to the elastic force of the material.

The pressing tube 30 is a tubular member made of metal, resin, or the like. As shown in FIG. 3, the proximal-end portion 20a of the arm portion 20 is accommodated in the pressing tube 30. The distal-end portion of the arm portion 20 protrudes from the distal-end opening 30a of the pressing; tube 30. The proximal-end opening 30b of the press ng tube 30 is smaller than the distal-end opening 30a.

Figure 4:
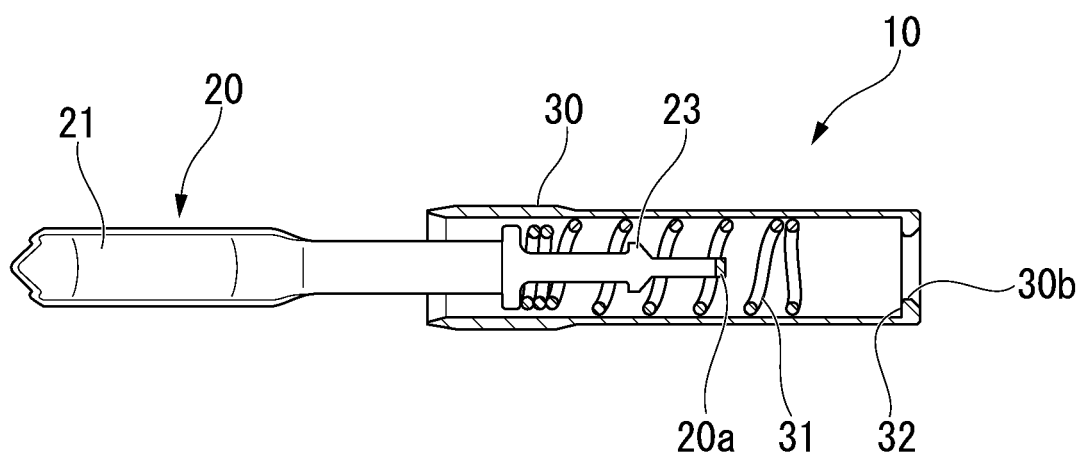
FIG. 4 is a cross-sectional view showing the clip unit in which a cross section from a direction different from that in FIG. 3 is shown.

FIG. 4 is a view of the inside of the pressing tube 30 as viewed from a direction different from that of FIG. 3. As shown in FIG. 4, a locking portion 23 is provided in an intermediate portion of each arm of the arm portion 20, and the dimension of each of the arm 21 and the arm 22 in the width direction thereof at the locking portion 23 is large (only the first arm 21 is visible in FIG. 4). Each locking portion 23 can pass through the proximal-end opening 30b when the first arm 21 and the second arm 22 approach each other. If the first arm 21 and the second arm 22 are separated from each other after passing through the proximal-end opening 30b, it is impossible for the locking portion 23 to pass through the proximal-end opening 30b. As a result, the arm portion 20 is locked with the pair of arms closed.

A coil spring 31 is arranged inside the pressing tube 30. The front end of the coil spring 31 can come into contact with the rear surfaces of the first arm 21 and the second arm 22. The rear end of the coil spring 31 can come into contact with the rear end surface 32 of the pressing tube 30 having the proximal-end opening 30b.

The basic structures of the arm portion 20 and the pressing tube 30 described above are known and are disclosed, for example, in PCT International Publication No. 2014/181676.

As shown in FIG. 1, the applicator 50 includes an elongated insertion portion 51, an operation wire (power transmission member) 52 passed through the insertion portion 51, and an operation portion 60 connected to the insertion portion 51.

As the insertion portion 51, for example, a sheath formed of a coil can be used.

The operation unit 60 includes a main body 61 connected to the insertion unit 51 and a slider 62 slidably attached to the main body 61.

As the operation wire 52, for example, a stranded wire made of a metal wire can be used. The proximal-end portion of the operation wire 52 is connected to the slider 62. When the slider 62 is moved with respect, to the main body 61, the operation wire 52 can be advanced and retracted in the insertion portion 51.

Figure 5:
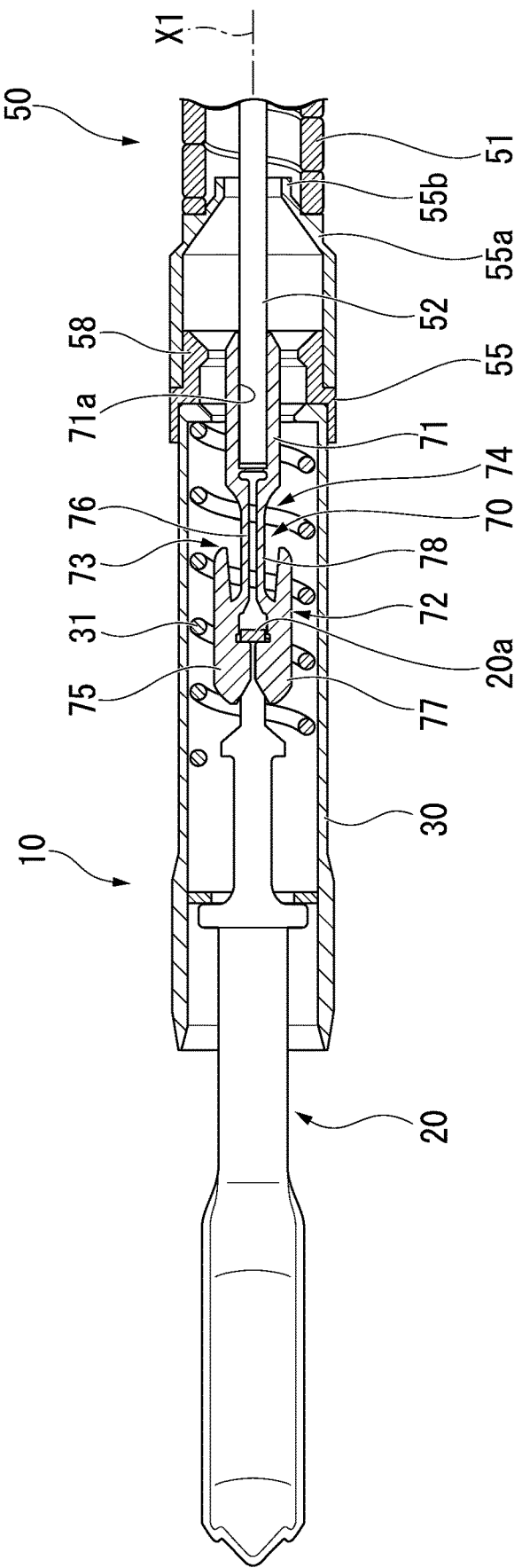
FIG. 5 is an enlarged cross-sectional view showing a clip mounting portion in the ligation device.

FIG. 5 is an enlarged cross-sectional view showing the distal-end portion of the applicator 50 to which the clip unit 10 is mounted.

A hook (connector) 70 that engages with the clip unit 10 is fixed to the distal end of the operation wire 52. As shown in FIG. 5, the distal-end portion of the operation wire 52 enters the pressing tube 30, and the hook 70 and the proximal-end portion 20a of the arm portion 20 are engaged with each other. The external dimension of the hook 70 is slightly smaller than the inner diameter of the coil spring 31, and the hook 70 can move inside the coil spring 31 without interfering with the coil spring 31.

The hook 70 has a rear portion 71 connected to the operation wire 52 and a front portion 72 that engages with the proximal end portion 20a.

The rear portion 71 is formed in a spindle shape that gradually shrinks as approaching both ends in the front-rear direction, and has a bottomed hole 71a that opens at the rear end. The distal-end portion of the operation wire 52 is entering the hole 71a. The operation wire 52 and the hook 70 are connected by, for example, the brazing or the like. According to the present embodiment, the hook 70 and the operation wire 52 are connected while maintaining a coaxial state.

The front portion 72 has a pair of engaging arm 73 and engaging arm 74. The engaging arm 73 and the engaging arm 74 sandwich the arm portion 20 from a direction orthogonal to the open-close direction of the arm portion 20. The engaging arm 73 has a claw portion 75 that comes into contact with the arm portion 20, and a plate-shaped portion 76 that connects the claw portion 75 and the rear portion 71. Similar to the engaging arm 73, the engaging arm 74 has a claw portion 77 and a plate-shaped portion 78, and the engaging arm 74 has the same shape as the engaging arm 73.

The engaging arm 73 and the engaging arm 74 are provided at positions symmetrical with respect to the central axis X1 of the hook 70.

As shown in FIG. 5, a rigid guide pipe (assistance member) 55 is attached to the distal end of the insertion portion 51. An inner diameter of the distal-end side region of the guide pipe 55 is larger than the outer diameter of the pressing tube 30, and the pressing tube 30 can enter the distal-end side region of the guide pipe 55. The guide pipe 55 has a reduced-diameter portion 55a whose inner diameter gradually decreases as approaching the proximal end thereof, and the inner diameter of the small-diameter portion 55b on the proximal end side of the reduced diameter portion 55a is approximately equal to the minimum inner diameter of the reduced-diameter portion 55a. The outer dimension of the rear portion 71 of the hook 70 is smaller than the inner diameter of the small-diameter portion 55b, and the maximum outer dimension of the front portion 72 defined by the claw portion 75 and the claw portion 77 is larger than the inner diameter of the small-diameter portion 55b.

The small-diameter portion 55b is formed to be thinner than the reduced-diameter portion 55a. According to the present embodiment, the insertion portion 51 and the guide pipe 55 are joined by welding or the like at the reduced-diameter portion 55a. As a result, there is a gap formed between the small diameter portion 55b and the insertion portion 51.

A stopper (not shown) is attached to the operation wire 52. Since the shape and dimensions of the stopper are set such that the stopper cannot enter the guide pipe, when the stopper comes into contact with the rear end of the guide pipe, the operation wire cannot advance any further.

The operations of the ligation device 1 configured as described above when used will be described. The ligation device 1 is introduced into the body via a channel of an endoscope. When inserting the ligation device 1 into the endoscope, the user retracts the slider 62 by a predetermined amount to insert the ligation device 1 in a state in which the arm portion 20 is closed and not locked. The clip unit 10 in which the arm portion 20 is closed and the distal-end portion of the insertion portion 51 may be inserted into the endoscope in a state of being accommodated in a separately prepared outer sheath.

When the ligation device 1 is protruded from the channel opening at the distal-end portion of the endoscope and the force for pulling the slider is decreased or the outer sheath is retracted, the arm portion 20 advances with respect to the pressing tube 30 due to its own elastic restoring force and the elastic restoring force of the coil spring 31. As a result, the pair of arm 21 and the arm 22 enter an open configuration. When the stopper comes into contact wish the rear end of the guide pipe 55, the arm portion 20 cannot advance with respect to the pressing tube 30 such that the open configuration is maintained and the arm portion 20 does not slip off from the pressing tube 30.

When the uses retracts the slider 62 with respect to the main body 61, the operation wire 52 is pulled and the arm portion 20 retracts with respect to the pressing tube 30. As a result, the pair of arm 21 and arm 22 enter the closed configuration. The user can ligate the tissues by locating the tissues between the pair of arm 21 and arm 22 and closing the pair of arm 21 and arm 22. By advancing the slider 62 with respect to the main body 61 until the locking operation described later is performed, it is possible for the pair of arm 21 and arm 22 to be transitioned from the closed configuration to the open configuration again. Accordingly, in the ligation device 1, it is possible to operate the clip unit 10 by the operation wire 52 to re-grasp the tissues until the locking operation is performed.

As shown in FIG. 5, a regulation portion 58 having an inner diameter slightly larger than the outer diameter of the hook 70 is provided in the guide pipe 55. The regulation portion 58 prevents the proximal-end portion 20a and the hook 70 from being unintentionally disconnected. In order to release the connection of the proximal-end portion 20a and the hook 70, it is necessary for the engaging arm 73 and the engaging arm 74 to be separated from each other by a pre-determined distance or more; however, there is no sufficient space in the regulation portion 58 for the engaging arm 73 and the engaging arm 74 to be separated from each other. As a result, the engagement between the hook 70 and the proximal-end portion 20a is not released until the engaging arm 73 and the engaging arm 74 pass through the regulation portion 58, and the engaging state is suitably maintained.

When it is determined that the tissues located between the pair of arm 21 and arm 22 may be ligated, the user performs the locking operation for fixing the arm portion 20 in the closed configuration. In the locking operation, the user further retracts the slider 62 with respect to the main body 61 beyond the range capable of performing the re-grasping operation. When the slider 62 retracts, the operation wire 52 is pulled, and the pair of arm 21 and arm 22 enter the pressing tube 30 while being substantially parallel with each other and sandwiching the tissues therebetween. Further, the locking portions 23 provided on the pair of arm 21 and arm 22 approach each other and realizes a positional relationship in which they can pass through the proximal-end opening 30b of the pressing tube 30.

The pair of locking portions 23 that have passed through the proximal-end opening 30b and moved outside of the pressing tube 30 are separated from each other again when the force received from the operation wire 52 weakens, and pair of locking portions 23 are in the positional relationship in which they cannot pass through the proximal-end opening 30b. As a result, the pair of locking portions 23 come into contact with the edge of the proximal-end opening 30b so as to prevent, the arm portion 20 from protruding from the pressing tube 30, and the arm portion 20 is locked while maintaining the closed configuration.

In the process of the locking operation, the proximal-end portion 20a and the hook 70 move outside of the pressing tube 30 through the proximal-end opening 30b; however, the engagement state between the proximal-end portion 20a and the hook 70 is suitably maintained by the regulation portion 58.

When the user further retracts the slider 62 after the arm portion 20 is locked, the engagement between the proximal-end portion 20a and the hook 70 is released, and the clip unit 10 is separated from the applicator 50. Hereinafter, the operations of the hook 70 at the time of releasing the connection will be described in detail.

Figure 6:
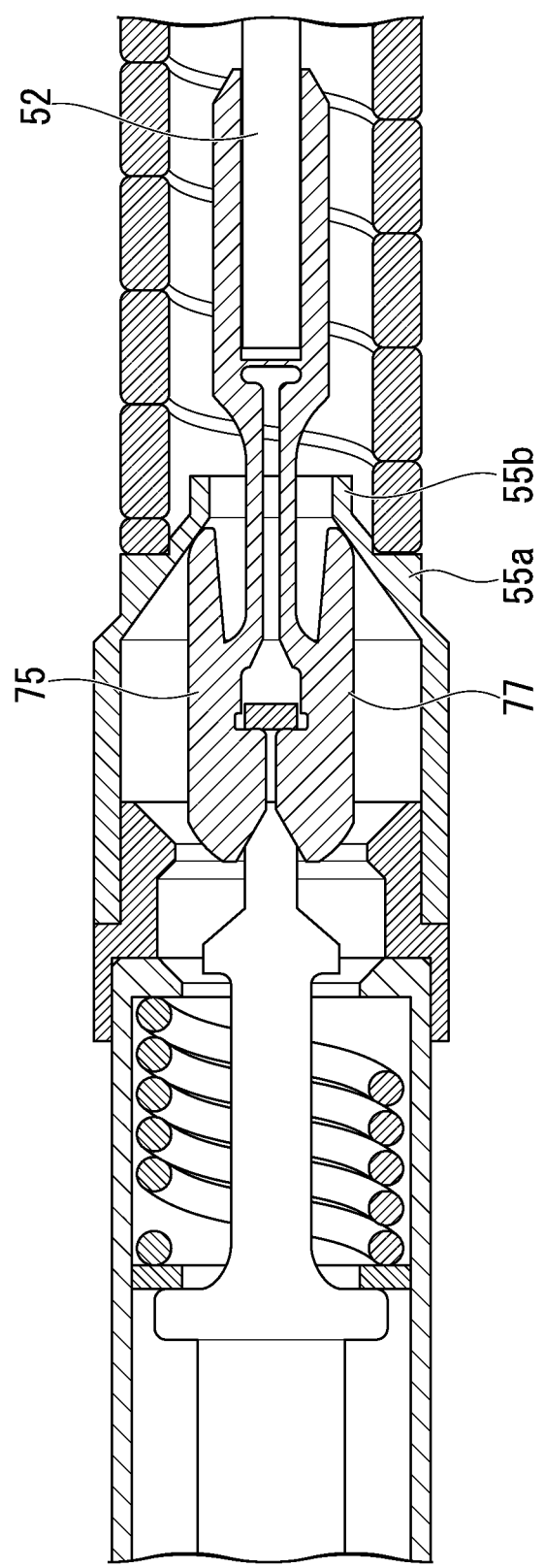
FIG. 6 is a schematic view showing a process of operations for releasing a connection between an arm and a hook in the ligation device.

When the slider 62 is retracted after the arm portion 20 is locked, the operation wire 52 is pulled. As a result, as shown in FIG. 6, the rear-end portions of the claw portion 75 and claw portion 77 come into contact with the inner surface of the reduced-diameter portion 55a. When the operation wire 52 is pulled, the rear-end portions of the claw portion 75 and claw portion 77 move along the inner surface of the reduced-diameter portion 55a and enter the small-diameter portion 55b.

Figure 7:
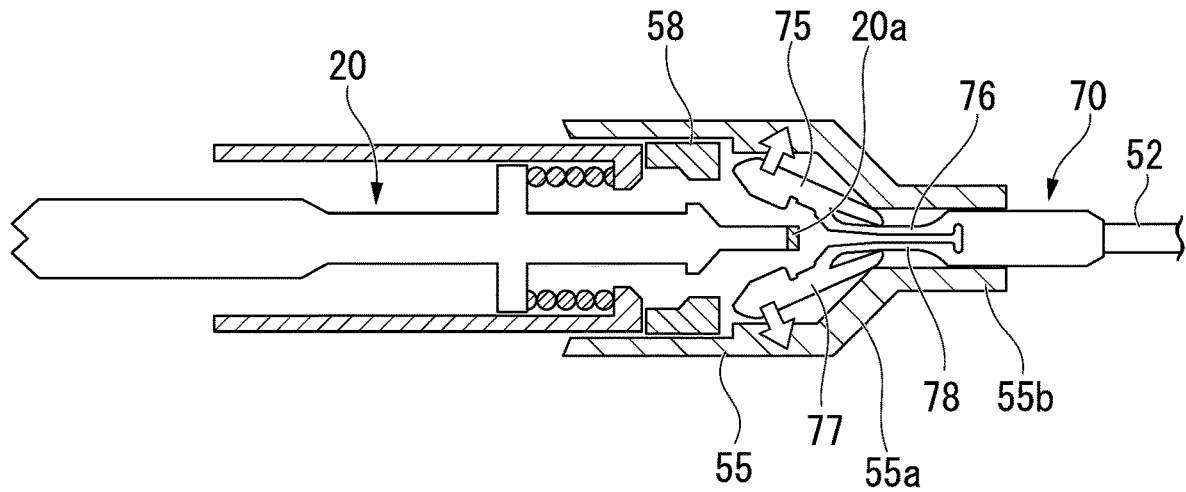
FIG. 7 is a schematic view showing a process of the operations for releasing the connection between the arm and the hook.

As the rear side of the claw portions enters the small-diameter portion 55b the claw portion 75 and claw portion 77 rotate about the connection portions with the plate-shaped portions, respectively. As a result, as shown in FIG. 7, the front-end side of the claw portion 75 and claw portion 77 move in a direction separating from each other and separate from the proximal-end portion 20a of the arm portion. In this way, the connection between the hook 70 and the arm portion 20 is released.

When the operation wire 52 is further pulled after the connection is released, the distal-end portions of the plate-shaped portion 76 and the plate-shaped portion 78 approach each other, and the claw portion 75 and claw portion 77 further enter the small-diameter portion 55b.

Figure 8:
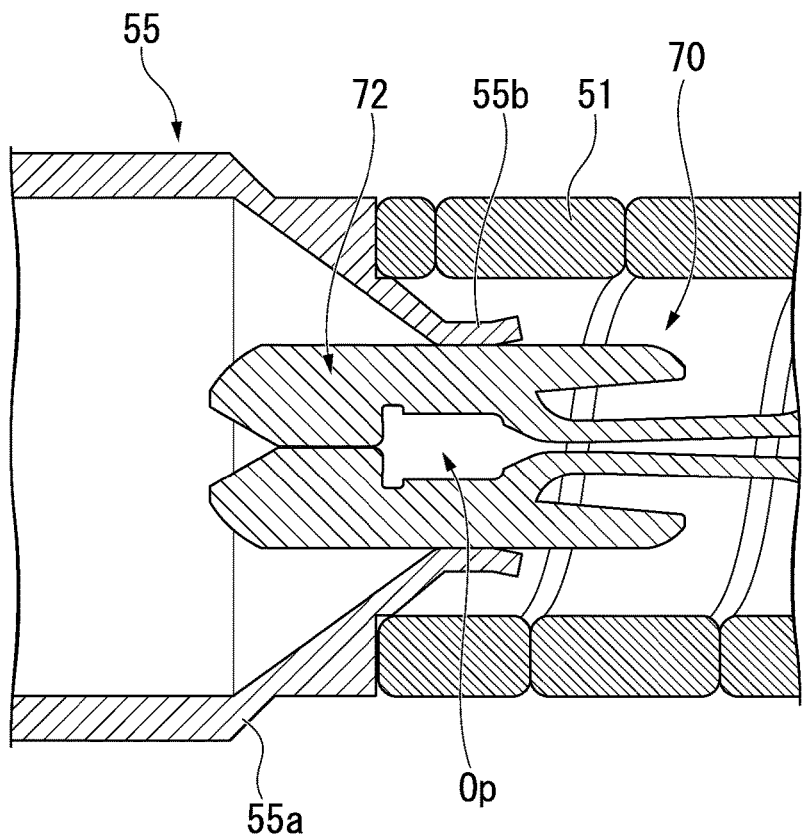
FIG. 8 is a view showing a process of operations in which the hook is removed from a guide pipe.

Since the small-diameter portion 55b is thin and has a gap between with the insertion portion 51, the small-diameter portion 55b is deformed toward the inner surface of the insertion portion 51 by receiving the force when the front portion 72 of the hook 70 enters. As a result, as shown in FIG. 8, the small diameter portion 55b passes through the front portion 72 while being deformed so as to increase the inner diameter. As a result, an opening Op through which the hook 70 can pass is formed in the small-diameter portion 55b. The inner diameter of the opening Op is larger than the inner diameter of the small-diameter portion 55b before the deformation.

When the user further retracts the slider 62, the hook 70 passes through the opening Op, slips off from the proximal-end opening of the guide pipe 55, and moves toward the hand side of the guide pipe 55. When the hook 70 is removed from the guide pipe 55, the external force resisting the pulling of the operation wire 52 does not apply on the hook 70 such that the force required to retract the slider 62 is greatly decreased and the operation of the slider 62 becomes lighter. Therefore, the user can easily recognize that the clip unit 10 has been separated from the applicator 50.

When the user removes the endoscope and the applicator 50 from the body, a series of procedures is completed.

As described above, according to the ligation device 1 according to the present embodiment, it is possible to prevent the connection of the clip unit 10 and the applicator 50 from being released before the arms of the clip unit 10 are locked even in the case of ligating the rigid tissues.

Also, simply by pressing the rear-end portions of the claw portion 75 and claw portion 77 against the reduced-diameter portion 55a of the guide pipe 55, the claw portions are opened to release the connection between the clip unit 10 and the applicator 50. Therefore, the user can release the connection simply by continuously retracting the slider 62, and the required force during the procedure can be made smaller than the force required when locking the arms.

Further, the hook 70 after the connection is released can be pulled out from the guide pipe 55 through the opening Op formed in the small-diameter portion by deforming the small-diameter portion 55b to increase the inner diameter. As a result, as described above, the operations of the slider 62 becomes significantly lighter, and the user can easily recognize that the clip unit 10 has been separated from the applicator 50.

According to the above-described operations, in the ligation device 1, it is possible to achieve both goals of reliably indwelling the clip unit 10 and realizing the easy operations in the state of sandwiching the rigid tissues.

Figure 9:
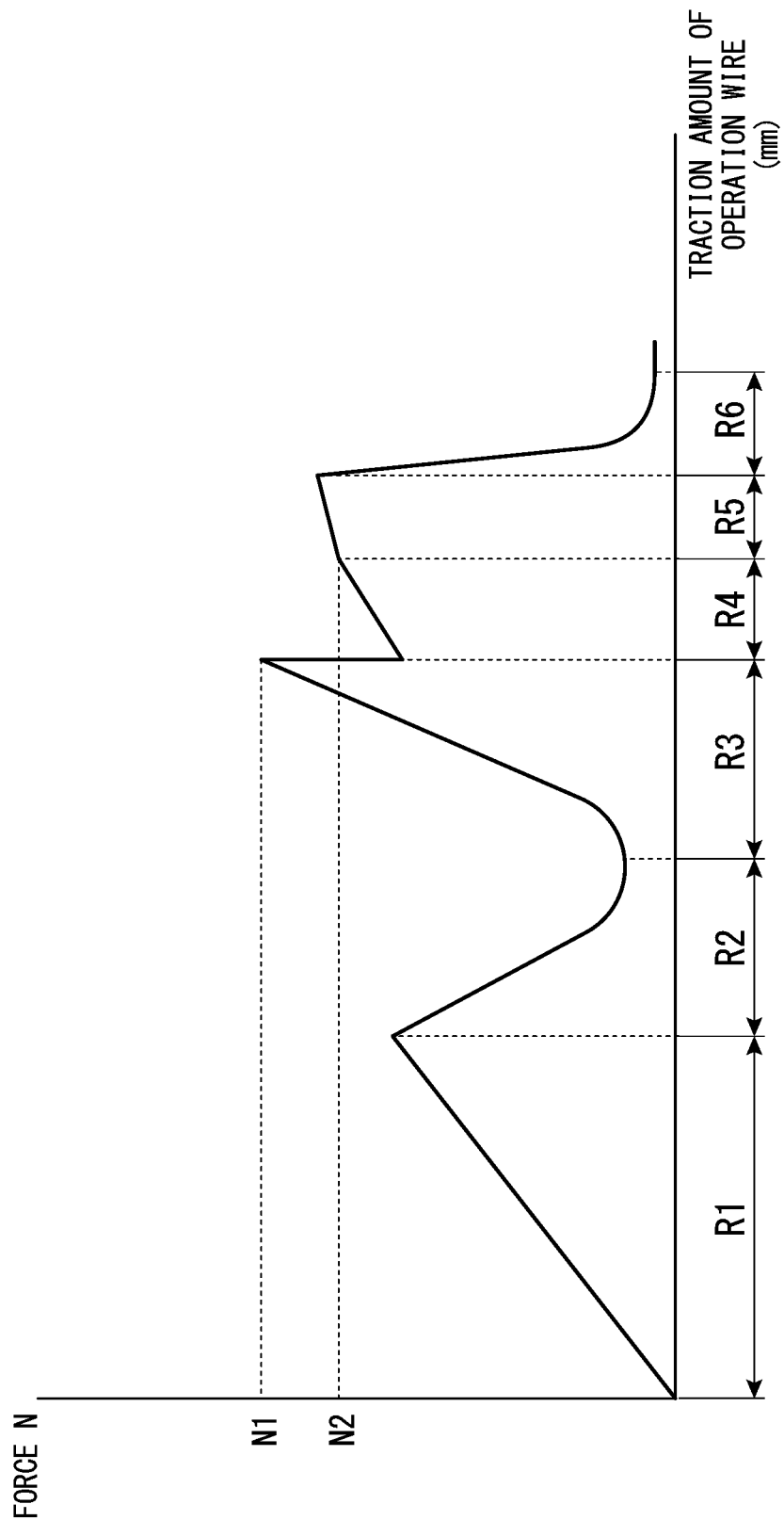
FIG. 9 is a graph showing a relationship between a traction amount and a value of force during the operations of the ligation device.

FIG. 9 shows the relationship between the traction amount of the operation wire 52 and the generated force. When the operation wire is pulled by operating the slider 62 after the arm portion sandwiches the tissues, the force N gradually increases due to the reaction force received from the sandwiched tissue in a region R1 until almost the entire arm portion is pulled into the pressing tube.

Subsequently, in a region R2 until the proximal-end portion of the arm portion reaches the proximal-end opening of the pressing tube, the force N gradually decreases since the arm portion and the inner surface of the pressing tube pipe are substantially parallel to each other.

Subsequently, in a region R3 until the arm portion is locked, the force N increases again since it is necessary for the locking portion 23 to be deformed to get over the proximal-end opening. Once the locking operation is complete, the power N drops once.

Subsequently, the force N increases again in a region R4 until the connection between the arm portion and the hook is released. Mechanically, if the maximum force value N2 in the region R4 is equal to or less than the maximum force value N1 in the region R3, the connection between the arm portion and the hook may be released before the arm portion is locked and the tissue may not be ligated. However, according to the present embodiment, due to the dimensional relationship between the regulation portion 58 and the claw portions 75, 77, it is possible to physically prevent the release of the connection while pressing the rear-end portions of the claw portions 75, 77 to the reduced-diameter portion 55a of the guide pipe 55 to open the claw portions so as to set the maximum force value N2 to be equal to or smaller than the maximum force value N1 and prevent the connection between the arm portion and the hook from being released before the arm portion is locked without depending on the rigidity of the claw portion.

Subsequently, in the region R5 until the claw portions 75, 77 enter the small-diameter portion 55b, the force N gradually increases; however, the small-diameter portion 55b is easily deformed to form the opening Op such that the maximum force value in the region R5 does not exceed the maximum force value N1. In the region R6 after the claws 75, 77 are removed from the guide pipe 55, the force N rapidly decreases such that it is easy for the user to recognize that the connection between the arm portion and the hook is released, that is, the clip unit is separated from the applicator.

A second embodiment of the present disclosure will be described with reference to FIG. 10 to FIG. 12. In the following description, the same reference signs will be given to the common configurations that have been described, and the duplicate description will be omitted.

Figure 10:
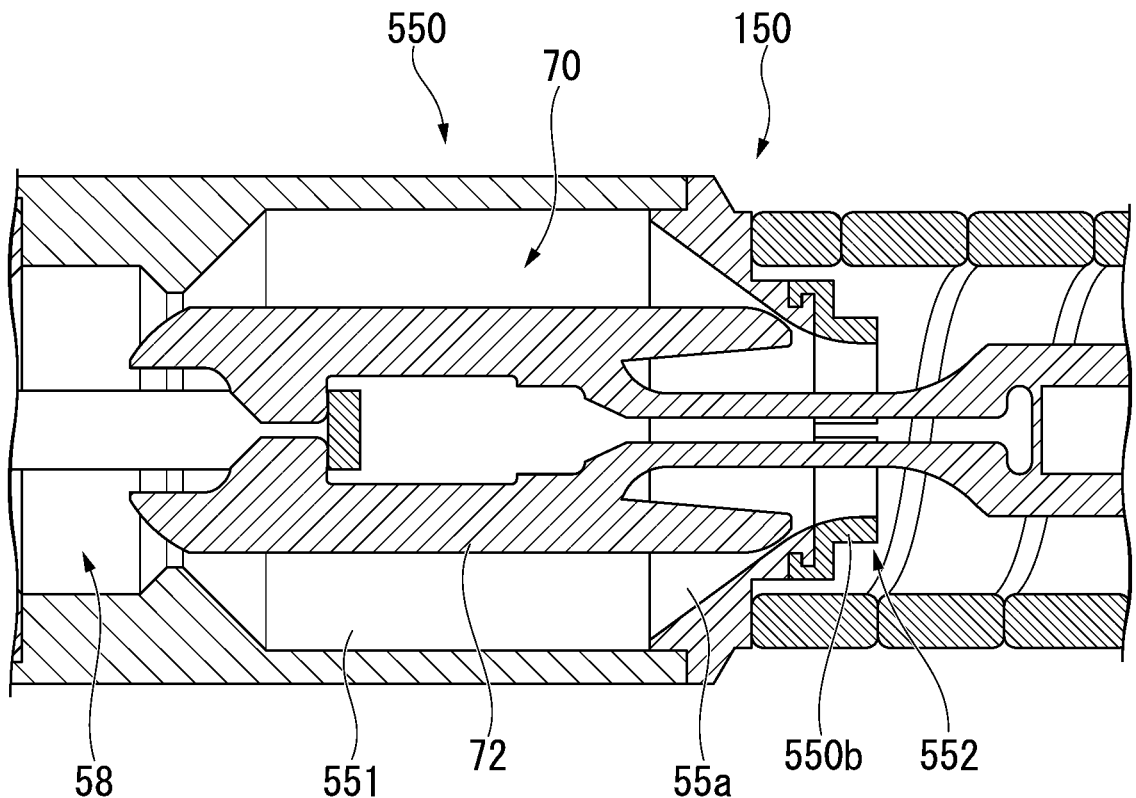
FIG. 10 is a partial enlarged view showing an applicator according to a second embodiment of the present disclosure.

FIG. 10 is a view showing the periphery of the guide pipe 550 of an applicator 150 according to the present embodiment. The guide pipe 550 is configured from two members, that is, a first member 551 having a regulation portion 58 and a reduced-diameter portion 55a, and a second member 552 having a small-diameter portion 550b.

Figure 11:
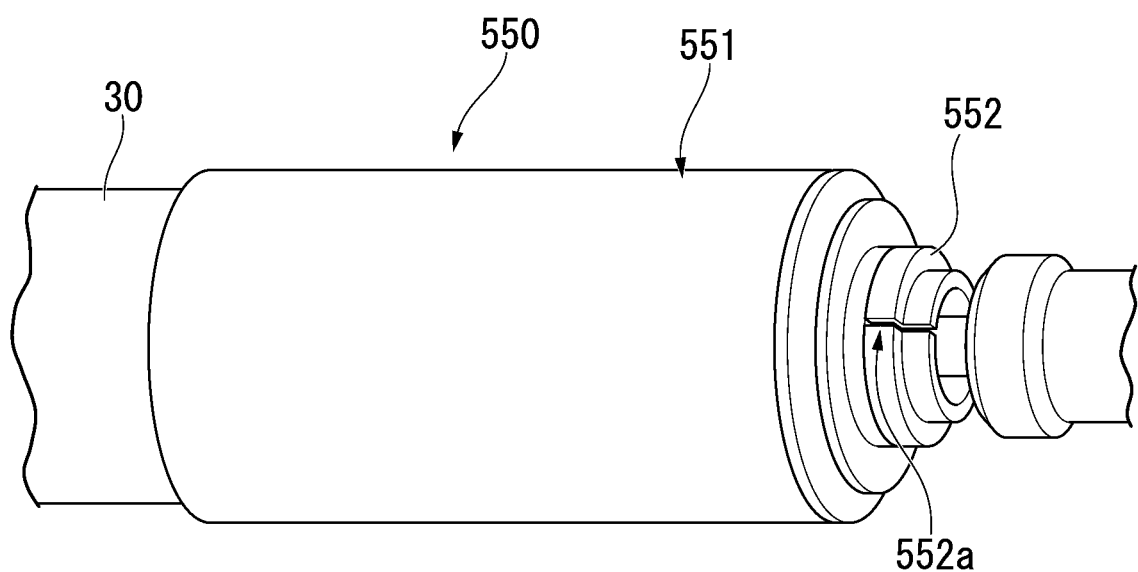
FIG. 11 is an appearance of a guide pipe of the applicator.

FIG. 11 is an external view of the guide pipe 550. The second member 552 has a tubular shape, and the outer circumferential surface thereof is divided by a slit 552a extending parallel to the own axis of the second member 552. As a result, the second member 552 has a C-shaped cross-sectional shape, and the outer circumferential surfaces facing each other with the slit 552a sandwiched therebetween can approach each other and be separated from each other.

The front portion of the second member 552 engages with the rear portion or the first member 551 from the outside, whereby the first member 551 and the second member 552 are integrated.

In the applicator 150 according to the present embodiment, when the front portion 72 of the hook 70 enters the small-diameter portion 550b, the front portion 72 pushes the second member 552 from the inside. As a result, the outer circumferential surfaces of the second member 552 facing each other with the slit 552a sandwiched therebetween are separated from each other. When the separating distance reaches a predetermined value or more, the engagement between the first member 551 and the second member 552 is released, and the second member 552 is separated from the first member 551.

As a result, an opening larger than the inner diameter of the small-diameter portion 550b is formed at the rear end of the first member 551 such that the hook can be smoothly pulled out from the guide pipe 550.

Similar to the applicator 50 according to the first embodiment, according to the applicator 150 according to the present embodiment, it is possible to achieve both goals of reliably indwelling the clip unit and realizing the easy operations in the state of sandwiching the rigid tissues.

In the present embodiment, the first member and the second member may be formed of the same material or may be formed of different materials. When the second member is made of a material that is more easily deformed than that of the first member, the thickness of the second member may be equal to or larger than that of the first member.

Figure 12:
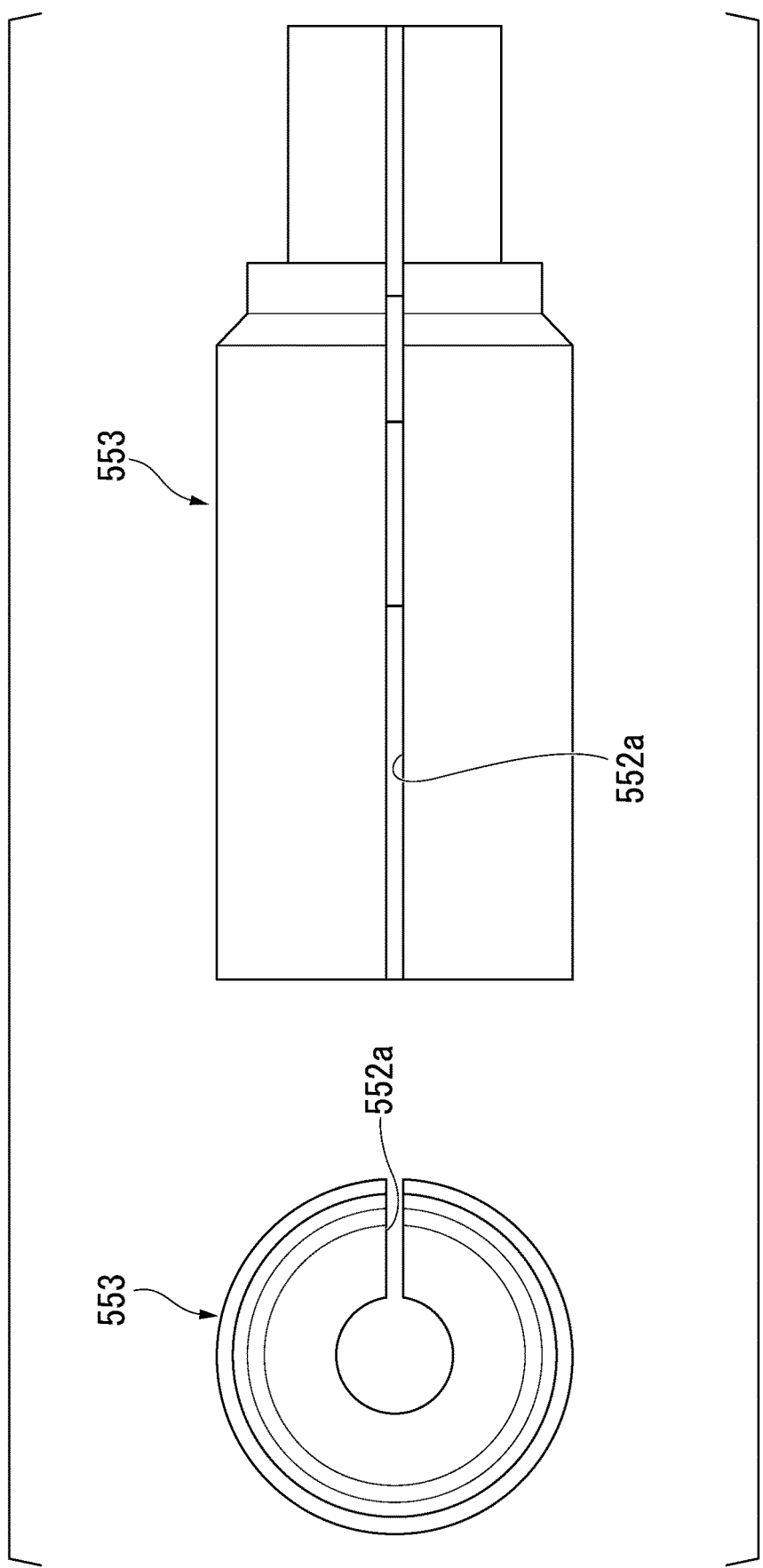
FIG. 12 is a view showing a modification example of the guide pipe.

Further, as in the modification example shown in FIG. 12, the shape of the first member and the shape of the second member may be formed by one member 553, and the slit 552a may be extended on the outer circumferential surface of the first member.

The slit only has to divide the outer circumferential surface of the small-diameter portion, and the slit may not in the linear shape.

When the hook front portion passes through the small-diameter portion, the second member does not necessarily have to be separated from the first member. In this case, the second member is pressed and expanded to form an opening in the second member having a size through which the front portion 72 can pass.

Although each embodiment of the present disclosure has been described above, the technical scope of the present disclosure is not limited to the above-described embodiment, and various changes or deletion may be made to each component within a range that does not deviate from the scope of the present disclosure.

In the present disclosure, the regulation member and the guide pipe are not essential. For example, the regulation portion may be provided in a part of the guide pipe, or the reduced-diameter portion and the small-diameter portion may be formed by molding the distal-end port on of the sheath configuring the insertion portion.

In a case of using the guide pipe, the opening may be formed by tearing a part of the guide pipe or the like.

The cross-sectional shape of the lumen of the small-diameter portion is not limited to the circle, and may be a polygon such as a square or the like.

The indwelling device according to the present disclosure is not limited to the clip unit described above. For example, the indwelling device may be a snare wire that can be indwelled in the body in a ligated state as described in Japanese Patent (Granted) Publication No. 4981157.

The power transmission member according to the present disclosure is not limited to the above-described wire. For example, in a case of applying the present disclosure to the treatment device or the like used with a laparoscope, the power transmission member may be a rigid rod.

The assistance member according to the present disclosure does not have to include the small-diameter portion. In this case, the opening is formed in the assistance member by pulling the power transmission member such that the connector makes the proximal-end portion of the reduced-diameter portion to be deformed.

Although the respective embodiments and modifications of the present disclosure have been described above, the technical scope of the present disclosure is not limited to the above-described embodiments, and configurations in the respective embodiments and modifications within the scope not departing from the spirit of the present disclosure. It is possible to change the combination of elements, make various changes to each configuration element, or delete each configuration element. For example, the configuration according to any one of above-described embodiments and modifications of the present disclosure may be appropriately combined with each modification of the operation portion. The present disclosure is not limited by the above description, but only by the appended claims.

What is claimed is:

1. A ligation device comprising:
   a clip device including an openable arm;
   a connector connected to the clip device, the connector being configured to be released from the clip device;
   a wire connected so the connector and configured to operate the clip device; and
   a pipe including an opening into which the wire is inserted, an inner diameter of the opening being smaller than a dimension in a diameter direction of the connector in a first state in which the connector and the clip device are connected with each other, and the inner diameter of the opening decreases towards a proximal end side of the pipe and is larger than the dimension of the connector in a second state in which the connector and the clip device are unconnected with each other.

2. The ligation device according to claim 1, wherein the pipe is configured to be deformable such that a configuration in which the inner diameter of the opening is smaller than the dimension of the connector is transitioned to a configuration in which the inner diameter of the opening is larger than the dimension of the connector during the second state.

3. The ligation device according to claim 2, wherein:
   the pipe includes a reduced-diameter portion in which the inner diameter of the pipe decreases towards the proximal end side of the pipe,
   the reduced-diameter portion includes a slit extending in an axial direction of the reduced-diameter portion, and
   the opening is configured to be deformable by the connector entering a proximal end of the reduced-diameter portion separating outer circumferential surfaces of the proximal end that are opposite to each other to sandwich the slit therebetween.

4. The ligation device according to claim 1, wherein:
   the pipe includes a reduced-diameter portion in which the inner diameter of the pipe decreases towards the proximal end side of the pipe and a small-diameter portion continuing and extending towards the proximal end side of the reduced-diameter portion, and
   the inner diameter of the opening is the same as an inner diameter of the small-diameter portion.

5. The ligation device according to claim 4, wherein:
   the inner diameter of the reduced-diameter portion is larger than the dimension of the connector when the pipe is in the first state, and
   the inner diameter of the small-diameter portion is smaller than the dimension of the connector.

6. The ligation device according to claim 4, wherein the small-diameter portion is more elastically deformable than the reduced-diameter portion.

7. The ligation device according to claim 1, wherein:
the connector includes a claw connected to the clip device, and
the dimension of the connector is the same as a dimension of the claw.

8. The ligation device according to claim 1, wherein the connector includes:
a plate-shaped portion extending along a longitudinal axis of the wire;
a claw extending from the plate-shaped portion toward a distal end side of the connector; and
a proximal-end portion extending from the plate-shaped portion toward a proximal end side of the connector.

9. The ligation device according to claim 8, wherein:
the pipe includes a reduced-diameter portion in which the inner diameter of the pipe decreases towards the proximal end side of the pipe and a small-diameter portion continuing and extending towards the proximal end side of the reduced-diameter portion, and
the connection of the connector and the clip device is released by the proximal-end portion contacting the reduced-diameter portion.

10. The ligation device according to claim 1, wherein:
the clip device further includes a pressing tube into which the arm is inserted, and
an inner diameter of the pipe is larger than an outer diameter of the pressing tube.

11. A ligation device comprising:
a clip arm configured to be openable;
an assistance member into which at least part of the clip arm is inserted; and
an opening provided in the assistance member, the opening including a first diameter when the clip arm is arranged at a first position, and the opening is configured to be enlarged to a second diameter, which is larger than the first diameter, when the clip arm is arranged at a second position closer to the opening than the first position.

12. The ligation device according to claim 11, further comprising an applicator releasably connected with the clip arm, wherein:
the clip arm and the applicator are connected with each other when the clip arm, is arranged at the first position, and
the connection of the clip arm and the applicator is released when the clip arm is arranged at the second position.

13. The ligation device according to claim 12, wherein:
the applicator includes a connector releasably connected with the clip arm,
the connector is arranged to be located distally of the opening when the clip arm is arranged at the first position, and
at least part of the connector is inserted into the opening when the clip arm is arranged at the second position.

14. The ligation device according to claim 13, wherein:
the assistance member includes a reduced-diameter portion in which the inner diameter of the pipe decreases towards the proximal end side of the pipe and a small-diameter portion continuing and extending towards the proximal end side of the reduced-diameter portion,
the connector includes (i) a plate-shaped portion extending along a longitudinal axis of the wire, (ii) a claw extending from the plate-shaped portion toward a distal-end side, and (iii) a proximal-end portion extending from the plate-shaped portion toward a proximal-end side, and
the connection of the connector and the clip arm is released by the proximal-end portion contacting the reduced-diameter portion.

15. The ligation device according to claim 14, wherein the small-diameter portion is more elastically deformable than the reduced-diameter portion.

16. A connection release method of an indwelling device in a ligation device, the ligation device including a connector releasably connected to the indwelling device that is configured to be disposed in a specimen, a force transmission member connected to the connector, and an assistance member including an opening into which the force transmission member is inserted, the connection release method comprising:
making the connector to come into contact with the assistance member by pulling the force transmission member;
separating the connector from the indwelling device by making the connector contact the assistance member to deform the connector; and
enlarging an inner diameter of the opening from a first diameter, which is smaller than an outer diameter of the connector, to a second diameter, which is larger than the outer diameter of the connector, by pulling the force transmission member.

17. The connection release method of the indwelling device according to claim 16, further comprising:
deforming the connector by pulling the force transmission member with a first force to separate the connector from the indwelling device, and
moving the connector to a position at a more proximal end side than the assistance member through the opening by pulling the force transmission member with a second force, which is smaller than the first force.

18. The connection release method of the indwelling device according to claim 16, wherein:
the assistance member includes a reduced-diameter portion in which the inner diameter of the pipe decreases towards a proximal end side of the pipe and a small-diameter portion continuing and extending to the proximal end side of the reduced-diameter portion,
the connector is deformed by making the connector contact the reduced-diameter portion to separate the connector from the indwelling device, and
an inner diameter of the small-diameter portion is enlarged from a first diameter, which is smaller than the outer diameter of the connector, to a second diameter, which is larger than the outer diameter of the connect, by pulling the force transmission member.

19. The connection release method of the indwelling device according to claim 18, wherein:
the connector includes (i) a plate-shaped portion extending along a longitudinal axis of the wire, (ii) a claw extending from the plate-shaped portion toward a distal-end side, and (iii) a proximal-end portion extending from the plate-shaped portion toward a proximal-end side, and
the connector is deformed by making the proximal-end portion contact the reduced-diameter portion to separate the connector from the indwelling device.

20. The connection release method of the indwelling device according to claim 19, wherein:

the indwelling device is a clip device including an openable arm and a pressing tube into which the arm is inserted, and an inner diameter of the assistance member is larger than an outer diameter of the pressing tube.

* * * * *